US012681963B2

(12) United States Patent (10) Patent No.: US 12,681,963 B2
Browder et al. (45) Date of Patent: Jul. 14, 2026

(54) METHOD AND SYSTEM FOR GENERATING A RESPONSE STRUCTURE USING A CHATBOT USER INTERFACE

(71) Applicant: Signet Health Corporation, North Richland Hills, TX (US)

(72) Inventors: Blake Browder, Dallas, TX (US); Joy Figarsky, Little Rock, AR (US)

(73) Assignee: BH Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/957,766

(22) Filed: Nov. 24, 2024

(65) Prior Publication Data

US 2026/0147792 A1 May 28, 2026

(51) Int. Cl.
*G06F 16/332* (2025.01)
*G06F 3/0482* (2013.01)
*G06F 16/3329* (2025.01)

(52) U.S. Cl.
CPC .... *G06F 16/3323* (2019.01); *G06F 16/33295* (2025.01); *G06F 3/0482* (2013.01)

(58) Field of Classification Search
CPC ........... G06F 16/3323; G06F 16/33295; G06F 3/0482
See application file for complete search history.

(56) References Cited

U.S. PATENT DOCUMENTS

| | | | |
|---|---|---|---|
| 12,014,807 B2 | 6/2024 | Schudlo et al. | |
| 2021/0110316 A1* | 4/2021 | Fountaine | G06F 3/167 |
| 2023/0128497 A1* | 4/2023 | Vijayan | G06F 16/24522 |
| | | | 707/690 |

(Continued)

FOREIGN PATENT DOCUMENTS

| | | |
|---|---|---|
| IN | 202041031127 A | 7/2020 |
| IN | 202011043166 A | 10/2020 |

(Continued)

OTHER PUBLICATIONS

Wayne Carter; 3 Innovative Uses of AI Chatbots in Behavioral Health; BillingParadise website; https://www.billingparadise.com/blog/innovative-uses-of-ai-chatbots-in-behavioral-health/.

*Primary Examiner* — Khanh B Pham
*Assistant Examiner* — Ranjit P Doraiswamy
(74) *Attorney, Agent, or Firm* — CALDWELL LLC

(57) ABSTRACT

A system for generating a response structure using a chatbot user interface, wherein the system includes a display device, a memory; and at least a processor, wherein the memory contains instructions configuring the at least a processor to: receive a query using a chatbot interface operating on the display device; generate an action protocol as a function of the query, including: generating a set of requested data constraints using a constraint machine-learning model; and mapping the set of requested data constraints to a range of database entries; generate a response structure as a function of the action protocol, wherein generating the response includes: retrieving requested data from a database; inputting the requested data and the query into a second large language model; and generating the response structure using the second large language model; and configure the display device to display the response structure using the chatbot interface.

20 Claims, 9 Drawing Sheets

(56) References Cited

U.S. PATENT DOCUMENTS

| | | | |
|---|---|---|---|
| 2024/0394502 A1* | 11/2024 | Sami | G06N 3/006 |
| 2025/0061307 A1* | 2/2025 | Tran | G06N 3/045 |
| 2025/0124001 A1* | 4/2025 | Everest | G09B 5/065 |

FOREIGN PATENT DOCUMENTS

| | | | |
|---|---|---|---|
| IN | 202421043877 A | 7/2024 | |
| WO | WO-2024163599 A1 * | 8/2024 | G06F 16/9538 |

* cited by examiner

200a 208    216e    216f    212    216a 204    216b

Figure 2A:
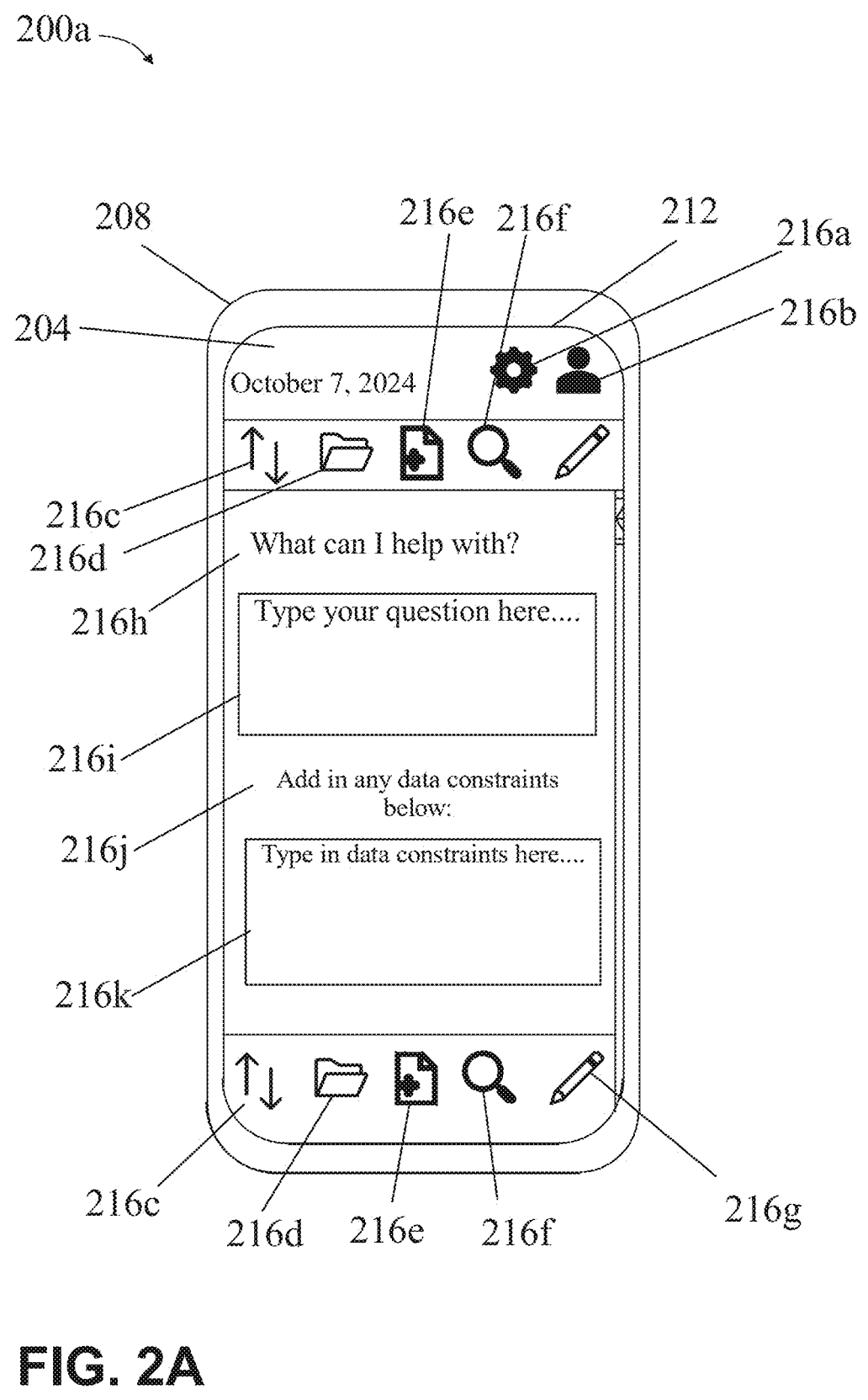

October 7, 2024

216c
216d

What can I help with?

216h

Type your question here....

216i

Add in any data constraints
below:

216j

Type in data constraints here....

Figure 2B:
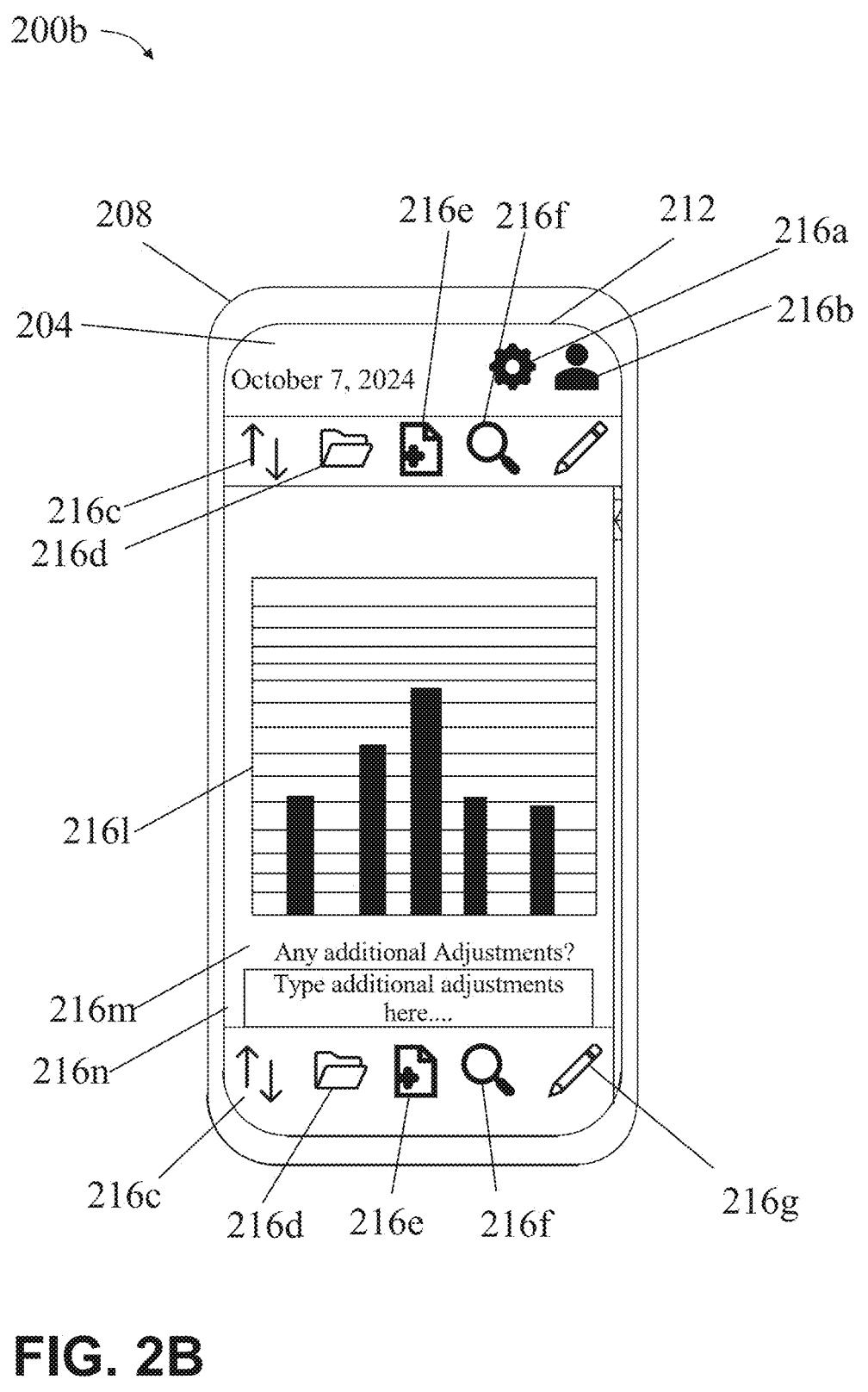

Any additional Adjustments?
Type additional adjustments here....

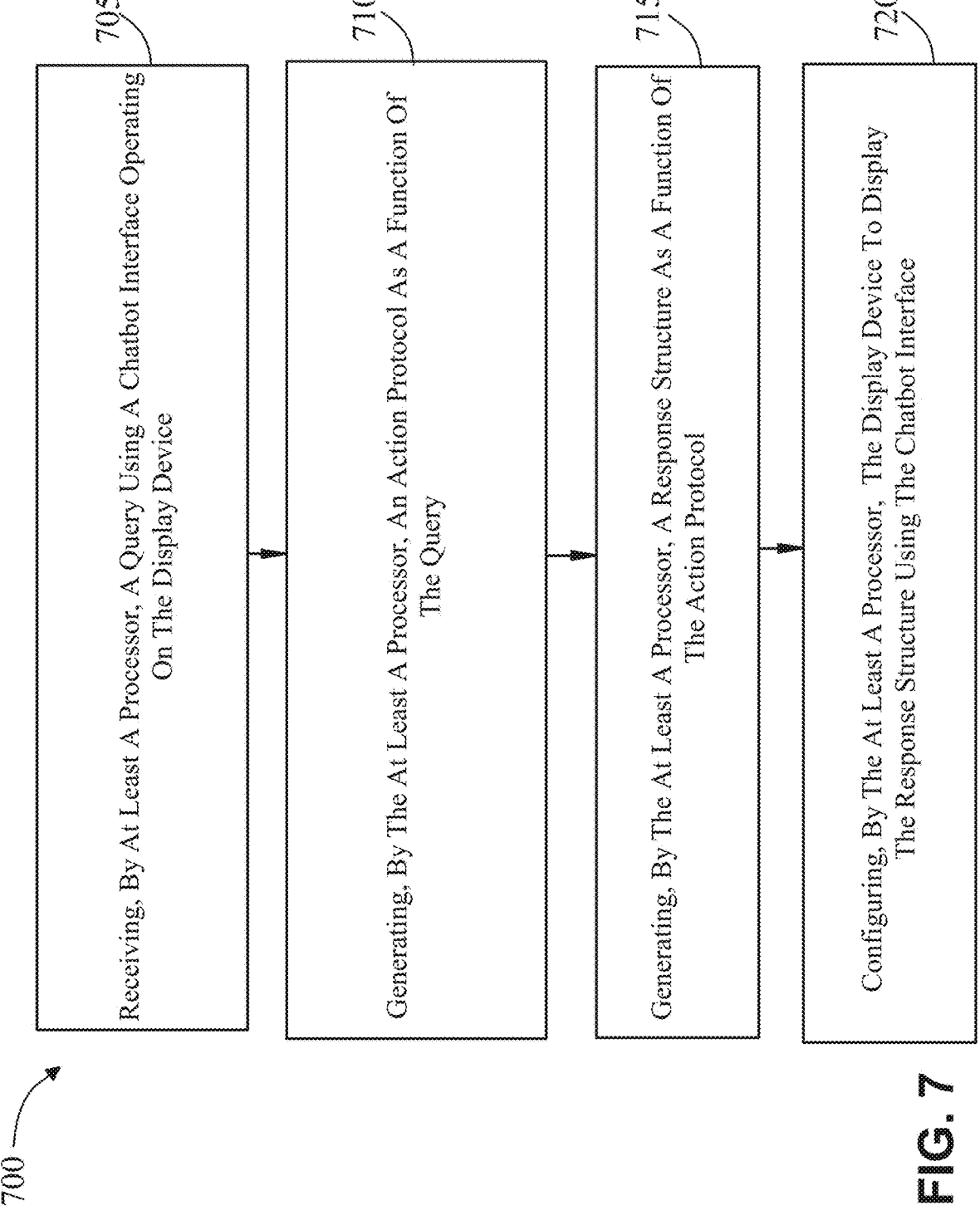

705

Receiving, By At Least A Processor, A Query Using A Chatbot Interface Operating On The Display Device

710

Generating, By The At Least A Processor, An Action Protocol As A Function Of The Query

715

Generating, By The At Least A Processor, A Response Structure As A Function Of The Action Protocol

720

Configuring, By The At Least A Processor, The Display Device To Display The Response Structure Using The Chatbot Interface

METHOD AND SYSTEM FOR GENERATING A RESPONSE STRUCTURE USING A CHATBOT USER INTERFACE

FIELD OF THE INVENTION

The present invention generally relates to the field of user interfaces. In particular, the present invention is directed to a method and system for generating a response structure using a chatbot user interface.

BACKGROUND

Modern graphical user interfaces (GUIs) used in interactive systems, such as chatbot interfaces, often struggle to dynamically generate contextually relevant responses based on user queries. Current systems typically rely on static response generation methods that fail to efficiently handle complex queries or adapt to real-time user inputs. This limits the system's ability to provide accurate and relevant responses, especially when dealing with large sets of data.

SUMMARY OF THE DISCLOSURE

In an aspect, a system for generating a response structure using a chatbot user interface, wherein the system includes a display device, wherein the display device displays a graphical user interface; at least a computing device, wherein the computing device includes: a memory; and at least a processor communicatively connected to the memory, wherein the memory contains instructions configuring the at least a processor to: receive a query using a chatbot interface operating on the display device; generate an action protocol as a function of the query, wherein generating the action protocol includes: generating a set of requested data constraints using a constraint machine-learning model; and mapping the set of requested data constraints to a range of database entries; generate a response structure as a function of the action protocol, wherein generating the response includes: retrieving requested data from a database using the range of database entries; inputting the requested data and the query into a second large language model; and generating the response structure using the second large language model; and configure the display device to display the response structure using the chatbot interface.

In another aspect a method for generating a response structure transformation, wherein the method includes: receiving, by at least a processor, a query using a chatbot interface operating on the display device; generating, by the at least a processor, an action protocol as a function of the query, wherein generating the action protocol includes: generating a set of requested data constraints using a constraint machine-learning model; and mapping the set of requested data constraints to a range of database entries; generating, by the at least a processor, a response structure as a function of the action protocol, wherein generating the response includes: retrieving requested data from a database using the range of database entries; inputting the requested data and the query into a second large language model; and generating the response structure using the second large language model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2A is an exemplary illustration of a chatbot graphical user interface;

FIG. 2B is an exemplary illustration of a response structure in a graphical user interface;

FIG. 7 block diagram of an exemplary method for generating a response structure using a chatbot interface.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a response structure using a chatbot user interface. In an embodiment, a system for generating a response structure using a chatbot user interface, wherein the system includes a display device, wherein the display device displays a graphical user interface; at least a computing device, wherein the computing device includes: a memory; and at least a processor communicatively connected to the memory, wherein the memory contains instructions configuring the at least a processor to: receive a query using a chatbot interface operating on the display device; generate an action protocol as a function of the query, wherein generating the action protocol includes: generating a set of requested data constraints using a constraint machine-learning model; and mapping the set of requested data constraints to a range of database entries; generate a response structure as a function of the action protocol, wherein generating the response includes: retrieving requested data from a database using the range of database entries; inputting the requested data and the query into a second large language model; and generating the response structure using the second large language model; and configure the display device to display the response structure using the chatbot interface.

Figure 1:
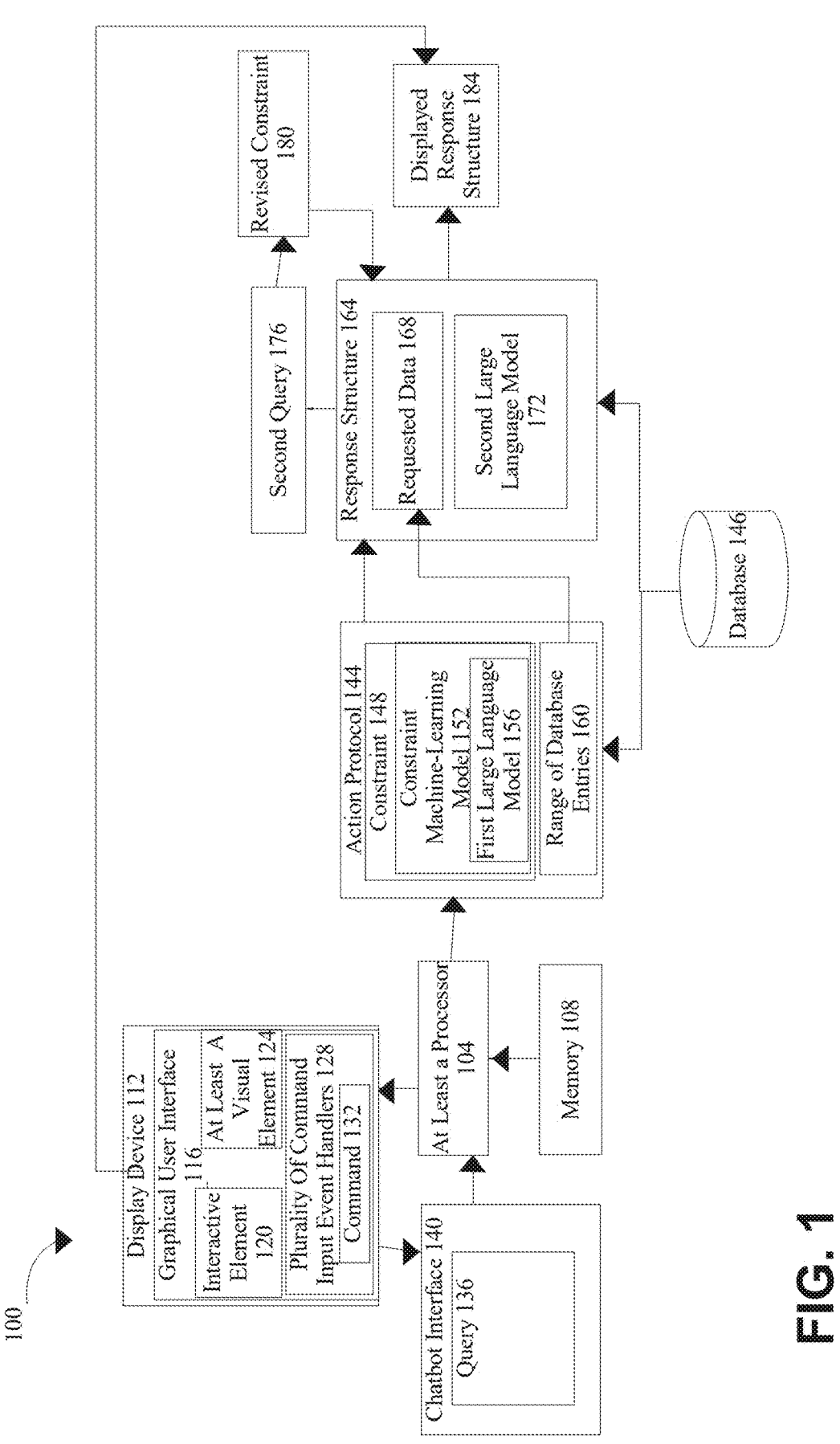
FIG. 1 is a flow diagram illustrating a system for generating a response structure using a chatbot interface.

Referring now to FIG. 1, an exemplary embodiment of a system 100 for generating a response structure using a chatbot interface is illustrated. System 100 may include a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electro-magnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or compo-nents. Further, communicative connection may include elec-trically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical com-munication, magnetic, capacitive, or optical coupling, and the like. In some instances, the terminology "communica-tively coupled" may be used in place of communicatively connected in this disclosure.

With continued reference to FIG. 1, memory 108 may include a primary memory and a secondary memory. "Pri-mary memory" also known as "random access memory" (RAM) for the purposes of this disclosure is a short-term storage device in which information is processed. In one or more embodiments, during use of the computing device, instructions and/or information may be transmitted to pri-mary memory wherein information may be processed. In one or more embodiments, information may only be popu-lated within primary memory while a particular software is running. In one or more embodiments, information within primary memory is wiped and/or removed after the com-puting device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 104. In one or more embodiments, data is transferred from secondary to primary memory wherein processor 104 may access the information from primary memory.

Still referring to FIG. 1, system 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data struc-ture, such as a distributed hash table or the like. The database may include a plurality of data entries and/or records as described above. Data entries in database may be flagged with or linked to one or more additional elements of infor-mation, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and trans-mitted back to computing device. In one or more embodi-ments, server may be configured to perform one or more processes as described below to allow for increased com-putational power and/or decreased power usage by the system computing device. In one or more embodiments, computing device may transmit processes to server wherein computing device may conserve power or energy.

Further referring to FIG. 1, system 100 may include any "computing device" as described in this disclosure, includ-ing without limitation a microcontroller, microprocessor, digital signal processor (DSP) and/or system on a chip (SoC) as described in this disclosure. System 100 may include, be included in, and/or communicate with a mobile device such as a mobile telephone or smartphone. System 100 may include a single computing device operating independently, or may include two or more computing devices operating in concert, in parallel, sequentially or the like; two or more computing devices may be included together in a single computing device or in two or more computing devices. System 100 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a comput-ing device. Processor 104 may include but is not limited to, for example, a computing device or cluster of computing devices in a first location and a second computing device or cluster of computing devices in a second location. System 100 may include one or more computing devices dedicated to data storage, security, distribution of traffic for load balancing, and the like. System 100 may distribute one or more computing tasks as described below across a plurality of computing devices of computing device, which may operate in parallel, in series, redundantly, or in any other manner used for distribution of tasks or memory between computing devices. System 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a display device 112 wherein display device 112 displays a graphical user interface 116. As used herein, a "display device" refers to an electronic component configured to visually present information, graphics, or data to a user. A "graphical user interface," as used herein, is a graphical form of user interface that allows users to interact with electronic devices. In some embodiments, GUI 116 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages, and the like may be represented using a small picture in a graphical user interface. For example, links to decentralized platforms as described in this disclosure may be incorporated using icons. Using an icon may be a fast way to open documents, run programs etc. because clicking on them yields instant access.

As used in this disclosure, an "interactive element" is a component within a system, interface, or device that allows a user to engage with and influence the system's behavior or output through actions. In a non-limiting example, the actions may include clicking, touching, or inputting data. Without limitation, the interactive element 120 may respond dynamically to a query 136, enabling real-time feedback or control over system functions. For example, without limitation the interactive element 120 may include buttons, sliders, input fields, or menus in software interfaces, as well as physical controls like switches or touchscreens in hardware devices. Each interactive element of a plurality of interactive elements may comprise an event handler configured to detect an interaction and generate response data as a function of the interaction.

As used in this disclosure, a "visual element" is a component or feature within a system, display, or interface that conveys information through visual means. In a non-limiting example, the interactive element 124 may include text, images, icons, shapes, colors, and/or other graphical components designed to be perceived by the user. In a non-limiting example, the interactive element 124 may aid in communication, navigation, and/or interaction with the system. Without limitation, the interactive element 124 may be used to enhance user experience, guide behavior, and/or represent data visually in an intuitive or informative way. A interactive element 124 may include any data transmitted to display device, client device, and/or GUI 116. In some embodiments, interactive element 124 may be interacted with. For example, interactive element 124 may include an interface, such as a button or menu. In some embodiments, interactive element 124 may be interacted with using a user device such as a smartphone, tablet, smartwatch, or computer.

Still referring to FIG. 1, processor 104 displays, using the GUI 116, a plurality of command input event handlers 128 wherein a command 132 in the plurality of command input event handlers 128 corresponds to the at least a interactive element 124. As used in this disclosure, a "command input event handler" is a is a structured list of tasks, instructions, and/or operations that are organized in a specific sequence. In a non-limiting example, the plurality of command input event handlers 128 may include at least a command 132. As used in this disclosure, a "command" is an instruction or directive given to a person, system, device, and/or process to perform a specific action or task. Without limitation, the command 132 may initiate an operation, alter system behavior, or trigger a response, and may be issued manually by a user or automatically by a program or system. In a non-limiting example, the command 132 may control hardware functions, execute software routines, or interact with external systems, and may be part of a sequence within the plurality of command input event handlers 128. In a non-limiting example, the command 132 may be awaiting execution or confirmation from a user. In a non-limiting example, the plurality of command input event handlers 128 may function as a checklist where each command 132 or task may be processed, executed, or marked as completed by the user or system.

Still referring to FIG. 1, processor 104 receives a query 136 using a chatbot interface 140 operating on a display device 112. As used herein, a "query" refers to a request for information or data, typically in the form of a question or command. In an embodiment, a query may be used to retrieve specific data from a database, wherein system 100 processes the query 136 by parsing it for keywords, applying relevant filters, and matching it against pre-indexed or real-time data sources. The system 100 may return relevant information based on the selected criteria. A query 136 may represent a user input in the form of a question or prompt. Examples of queries may include "What are the admittance number statistics?", "How many free beds are available?", or "Why was this patient denied?", and the like. As used herein, a "chatbot interface" refers to a user interface that allows users to interact with system 100 through natural language input, typically in the form of text or speech. In an embodiment, the chatbot interface 140 enables users to issue queries, provide commands, or make specific requests, to which system 100 is configured to respond with relevant data or actions. The chatbot interface 140 may utilize Natural Language Processing (NLP) to interpret and process the user's input. NLP is a subfield of artificial intelligence focused on enabling computers to process, understand, and generate human language. NLP systems consist of multiple layers of text analysis, including tokenization (breaking down a query into individual components such as words or phrases), part-of-speech tagging (identifying grammatical elements in the query), syntactic parsing (understanding sentence structure), and semantic analysis (extracting the meaning and intent behind the query). In an embodiment, the chatbot interface 140 may incorporate advanced NLP techniques, such as word embeddings (e.g., Word2Vec, GloVe), which map words to vector representations to capture context and meaning, as well as transformer-based architectures (e.g., BERT, GPT), which allow the system to handle more complex queries that depend on contextual relationships between words. Additionally, the system 100 may apply entity recognition to identify key elements within the query (e.g., patient names, medical terms, statistics) and intent recognition to classify the purpose of the query (e.g., requesting information, making a decision, performing an action). Upon processing the query 136, system 100 may use these NLP models to generate an action protocol 144, which could range from retrieving structured data from databases (e.g., bed availability or admission numbers) to offering explanations based on the inferred meaning of the query (e.g., reasons for patient denial). The response may be structured in a conversational manner, mimicking human-like interaction to improve the user experience. Through the chatbot interface 140, users can seamlessly interact with system 100, which leverages NLP to intelligently understand, process, and respond to queries in real time.

Continuing reference to FIG. 1, processor 104 may generate an action protocol 144 as a function of the query 136. As used herein, an "action protocol" refers to a set or sets of data generated in response to a query or command within a system. In the context of the chatbot interface 140, the action protocol 144 may define the next steps the system should take based on query 136. In a non-limiting embodiment, these steps could include executing a response, such as providing requested information or performing a specific action or issuing a request for additional information from the user to clarify or refine the query 136. In an embodiment, generating the action protocol 144 may include parsing database 146. In an embodiment, parsing the database 146 may involve searching across a specified range of database entries to locate matching data. If the range of database entries is empty or lacks sufficient information to proceed, the processor may generate a request for additional information to help refine the search parameters or expand the data scope. The GUI 116 generated by the processor could be dynamically updated to present this request for additional information to the user. For instance, the GUI 116 may display a pop-up window, alert, or dedicated input field prompting the user to provide specific details or clarify search criteria. This prompt could include fields such as date ranges, specific keywords, or categories that the user can fill out to improve the accuracy of the database search. Upon displaying this request for additional information, the system may then be configured to receive and process user input in response. This user-provided information may serve to refine or adjust the search parameters, enabling the processor to parse the database with an updated, more targeted approach. In another non-limiting embodiment, generating the action protocol 144 may include requesting additional data that is not contained within the database 146. In a non-limiting embodiment, if the database 146 does not have sufficient information to fulfill the user query 136, the system 100 may automatically initiate a secondary protocol to obtain the missing information. This could involve integrating external data sources, such as real-time sensors, third-party APIs, or external systems. Alternatively, the system may prompt the user to provide additional details or clarification. For instance, if a user queries, "What are the latest patient admittance trends?" and the available database lacks the necessary real-time data, the system may request updates from external resources or ask the user to refine the query by specifying a time range or location, ensuring that the system generates the most accurate response possible. Generating the action protocol 144 may include generating a set of requested data constraints 148 using a constraint machine-learning model 152. As used herein, a "data constraint" refers to a restriction applied to data within a system. The process of generating a set of requested data constraints 148 refers to defining specific parameters or limitations that guide how system 100 retrieves and processes information in response to query 136. In a non-limiting embodiment, requested data constraints 148 may include dates, gender, diagnoses, insurance policies, and the like. In an embodiment, data constraints 148 can be used to narrow down the scope of data to be retrieved from a database or other data sources, ensuring that the system returns the most accurate and relevant information. As used herein, "constraint machine-learning model" refers to a machine-learning model that is configured to identify and apply relevant constraints. In an embodiment, relevant constraints may include, data filters, ranges, or categories based on the nature of the query. Constraint machine-learning model may be trained using constraint training data configured to correlate inputs to outputs. In an embodiment, an input into the constraint machine-learning model may include query 136. Non-limiting examples of outputs may include example data constraints, historical data constraints, user-inputted constraints, queries, example queries, historical queries, action protocols, example action protocols, historical action protocols, feedback from previous iterations of the constraint machine-learning model and the like. In an embodiment, outputs of the constraint machine-learning model may include data categorizations that classify and organize data into specific, predefined groups or categories. These categorizations may be based on patterns, features, or relationships identified within the outputs. For example, the model might categorize data based on characteristics such as demographic segments, behavioral patterns, and the like. Non-limiting examples of outputs may include example data constraints, historical data constraints, and the like. In an embodiment, constraint machine-learning model 152 may be iteratively trained as a function of user feedback relating to the accuracy of an output of the constraint machine-learning model. For example, if the system returns a dataset based on constraints generated by the model and the user finds the information incomplete or irrelevant, the user can provide feedback indicating that the constraints were inaccurate. In an embodiment, positive feedback from a user related to the outputs may be added into the constraint training data. The system may then use this feedback to adjust the model's internal parameters. Over time, as the model is exposed to more feedback, it becomes better at understanding the types of constraints that lead to more precise and relevant data retrieval. The system may also employ reinforcement learning, where positive feedback reinforces correct outputs, while negative feedback penalizes incorrect ones, encouraging the model to favor more accurate constraint generation strategies. Through this continuous learning loop, the constraint machine-learning model may become more robust, improving its ability to generate constraints that align with user expectations and provide more accurate outputs over time. Constraint machine-learning model 152, may include a classifier configured to classify the query into one or more data constraints. The classifier may be trained to correlate the query to one or more example data constraints, example data constraints, and the like. Constraint machine-learning model may include a first large language model 156. A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, hospital documents, insurance information, emails, user communications, advertising documents, newspaper articles, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set May include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It's also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with queries.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Generating the action protocol 144 may also include mapping the set of requested data constraints 148 to a range of database entries 160. The process of mapping the set of requested data constraints 148 to a range of database entries 160 refers to aligning the constraints generated by the system with the appropriate data fields, records, or entries stored within a database. This mapping may ensure that the system retrieves only the most relevant data in response to the user query by applying the constraints as filters or selection criteria. For example, when the system receives a query such as "What are the available beds in the pediatric unit for the past week?" the constraint machine-learning model might generate specific constraints, such as "unit=pediatric" and "date range=past seven days." Mapping the set of requested data constraints involves translating these constraints into database-specific terms, ensuring they correspond to the correct fields (e.g., unit type, date, and bed availability) in the database schema. Once mapped, the system applies these constraints to identify and extract relevant database entries that meet the criteria, such as available bed records within the pediatric unit over the specified timeframe. In an embodiment, mapping the set of requested data constraints 148 may include using a lookup table. As used herein, a "lookup table" refers to a data structure that stores pre-define associations or mappings between input values and corresponding output values. In an embodiment, in the process of mapping the set of requested data constraints to specific database entries, a lookup table may store associations between commonly requested constraints (like unit types or date ranges) and the corresponding fields in the database schema (e.g., "pediatric unit" mapped to "unit=pediatric" or "past week" mapped to "date range=last seven days"). When the system receives a query, it can reference this lookup table to translate high-level constraints into precise, database-compatible terms without recalculating these mappings each time.

Continuing reference to FIG. 1, processor 104 may generate a response structure 164 as a function of the action protocol 144. As used herein, the "response structure" refers to a data structure formulated based on the user's query and the constraints defined by the system. The response structure may refer to the organized format in which the system presents the relevant data or information back to the user after processing the query. Generating the response structure 164 may include retrieving requested data 168 from database 146 using the range of database entries 160. This may involve executing a query against the database with the set of data constraints that were defined earlier, ensuring that only the data that meets the specific requirements (as determined by the query 136) is retrieved. For example, if the query 136 involves "bed availability in the pediatric unit over the past seven days," the system, guided by the action protocol 144, retrieves records from the database that fall within the constraints for unit type and date range. Once the relevant data is retrieved, the processor organizes the data into a structure that is appropriate for the type of response. In a non-limiting embodiment, this response structure could be in various formats, such as tables, graphs, summaries, or detailed lists, depending on the nature of the query and the user's preferences. For instance, a request for statistical data might result in a response structure that includes bar charts or trend graphs, while a request for detailed records may produce a structured list or table. In an embodiment, generating the response structure 164 may include generating at least a power point file. In an embodiment, retrieving requested data 168 from a database using the range of database entries involves executing a query against the database with the constraints 148 defined by action protocol 144. The processor 104 172Second may be configured to retrieve the relevant data entries that meet the specific criteria set by the user query, such as filtering by date ranges, categories, or any other constraints provided by the system. Once the database entries have been identified and extracted, the data may now be prepared for further processing. This step ensures that only the most relevant and targeted data is pulled from the database, avoiding unnecessary data and improving processing efficiency. Inputting the requested data and the query into a second large language model 172 to further generate the response structure 164. Once the data has been retrieved from the database, it is combined with query 136 and passed into a second large language model (LLM) 172. The second LLM 172 is configured to interpret not only the data but also the context of query 136. The second large language model 172 may also enhance the data by providing contextual insights, summarizing large datasets, or drawing conclusions that go beyond data retrieval. In an embodiment, processor 104 may be configured to generate the response structure 164 using the second large language model 172. For example, if the query 136 asks for an explanation of a trend in patient admissions, the second LLM 172 may analyze the retrieved data and provide a human-readable explanation, identifying key patterns, anomalies, or insights within the dataset. The response structure can be presented in various forms, such as natural language summaries, tables, charts, or actionable recommendations, depending on the nature of the query and the retrieved data.

In some embodiments, the response structure may also incorporate additional processing steps, such as summarizing large datasets, ranking results by relevance, or combining multiple data sources into a single unified response. By generating the response structure based on the action protocol, the system ensures that the output is not only accurate and relevant but also formatted in a way that enhances the user's understanding and interaction with the data. This structured approach streamlines the presentation of information, making complex datasets easily interpretable and actionable for the user.

Still referring to FIG. 1, in an embodiment, at least a processor 104 may be configured to receive at least a second query 176 as a function of the generated response structure 164. In an embodiment, once the system presents the initial response structure through the chatbot interface, the processor may be programmed to allow the user to submit a second query 176 based on the context or information provided in the response structure 164. This second query 176 could be directly related to the information displayed in the response structure or could seek further clarification, follow-up data, or a deeper analysis of the original data. The second query 176 may be triggered in various ways. For instance, a user might interact with specific elements of the displayed response, such as clicking on a graph, data point, or text segment, which could prompt the system to accept additional input. The event handler embedded in the display may detect this user interaction and prompt the processor to generate a secondary prompt, allowing the user to refine or expand their inquiry. The system could also anticipate potential follow-up questions by providing clickable options or pre-configured suggestions based on the initial query's context, thereby guiding the user toward a second query. In some embodiments, the processor could analyze the content of the first query and the resulting response to identify areas where further user clarification might be beneficial. For example, if the response structure 164 provided high-level statistics, the system 100 may invite the user to ask more detailed questions, such as a breakdown by specific time frames, locations, or categories, which would be processed as the second query. The second query 176 may also focus on action-based requests, such as updating or modifying the dataset, performing a "what if" analysis, or adjusting parameters like date ranges or data categories. The processor 104 may also ensure that the second query 176 is processed efficiently by referencing the data already retrieved in the original response. In some cases, the processor may retain or cache relevant data from the query 176, optimizing the system's performance by avoiding redundant data retrieval for the second query. The system could also modify or extend the action protocol generated from the initial query to accommodate the second query, ensuring that both queries are addressed seamlessly in a single interaction. In an embodiment, at least a processor 104 may be configured to generate revised constraints 180 as a function of the second query 176. This process may involve the system analyzing the second query 176 and adjusting or refining the constraint 148 that were applied in response to query 176. The revised constraints 180 could be generated by taking into account the new parameters or clarifications provided in the second query, allowing the system to retrieve more specific or targeted data. For instance, if the first query requested general statistics, and the second query seeks a breakdown by a specific time period or category, the processor may generate constraints that limit the data retrieval to only the relevant subset, such as filtering for a particular date range or demographic. In an embodiment, at least a processor 104 may be configured to generate a prompt requesting feedback from the user through GUI 166. At least a processor 104 may be configured to collect feedback from the prompt and use this feedback to retain the constraint machine-learning model 152.

Continuing reference to FIG. 1, processor 104 may configure the display device 112 to display the response structure 164 using the chatbot interface 140. Displayed response structure 184 may be configured to format and adapt the response structure 164 generated by the second large language model 172 for presentation within the chatbot's graphical user interface. The processor may ensure that the output is properly structured and suited for the display, enabling the user to easily view and interpret the provided information. In some embodiments, the processor may configure the display device to display different types of response structures, such as text-based explanations, tables, charts, or other visual elements, in a format that is optimized for the chatbot interface. For instance, the system could adjust the chatbot interface to display a neatly formatted paragraph for text-based responses, or a table or graph for more complex datasets. The configuration may include adjusting the layout, size, and positioning of the response elements to enhance readability and user interaction. Additionally, the chatbot interface 140 could support interactive elements, and the processor may configure the response structure to allow for user interaction, such as expanding data points, navigating through graphs, or requesting further details. The interface may be adaptable to provide real-time updates in response to further queries or user input. Configuring the display device to display the response structure may include generating a display data structure using a plurality of visual elements and at least an event handler. As used herein, a "plurality of visual elements" refers to multiple distinct components or feature within a visual composition. As used herein, "an event handler" refers to function of block of code in software development that responds to specific events or user interactions within a program or application. In an embodiment, the display data structure may be dynamically generated by the processor to ensure that the response structure is presented in a visually organized and interactive manner. The displayed response structure 184 could include various visual elements, such as text boxes, tables, graphs, charts, icons, or buttons, designed to represent the different aspects of the response structure. The visual elements may be arranged to improve clarity and user experience, allowing the user to quickly and effectively interpret the information. For instance, text-based responses could be displayed using structured paragraphs or bullet points, while complex datasets or statistical outputs may be presented as graphs or tables, enhancing the visual communication of the data. The layout of these visual elements may be responsive, adjusting to different display sizes or user preferences, ensuring the information is both accessible and easy to understand. The inclusion of at least an event handler may enable user interaction with the displayed visual elements. An event handler could be configured to respond to various user actions, such as clicking, tapping, hovering, or scrolling through different parts of the response structure. For example, if a graph is presented as part of the response, an event handler may allow the user to click on specific data points to reveal more detailed information. Similarly, for a text-based response, the event handler may enable the user to highlight or expand certain sections to get more context or additional data. The event handler may also be used to track and process further user input. If the user provides additional queries or requests clarification based on the displayed response structure, the event handler could trigger a reconfiguration of the visual elements, allowing for the display of updated or more detailed information.

Referring now to FIG. 2A, an exemplary illustration 200a of a chatbot graphical user interface. In an embodiment, the graphical user interface 204 may be displayed using a downstream device 208. In an embodiment, the graphical user interface 204 may include at least a visual element 212. In an embodiment, the visual element 212 may include an interactive element 216. In an embodiment the interactive element 216 may allow a user to engage directly with the graphical user interface 204 through a variety of actions.

In an embodiment, the interactive element 216a-i may include a settings gear 216a, a profile icon 216b, a sorting icon 216c, a folder 216d, a new task icon 216e, a find icon 216f, an edit icon 216g, a check box icon 216h, a scroll bar 216i, text description 216j, and the like.

In an embodiment, the interactive element 216 may include a settings gear 216a. In an embodiment, the settings gear 216a may enable users to access the system or application settings where they may modify preferences and configurations. Without limitation, by clicking on the settings gear 216a, users may adjust features like notifications, display options, account details, and the like. In an embodiment, the settings gear 216a may represent control over personalizing the environment within the application. In an embodiment, the settings gear 216a may ensure that users can customize their experience to meet their specific needs.

In an embodiment, the interactive element 216 may include a profile icon 216b, which may allow users to access their personal profile settings. In an embodiment, the profile icon 216b may link to a page where users may view and edit their personal information, such as their name, contact details, or profile picture. In an embodiment, the profile icon 216b may make it simple for users to manage their account and view related data quickly. In an embodiment, the profile icon 216b may be placed in a convenient location, allowing easy access to account settings. In an embodiment, the profile icon 216b may help users maintain control over their profile, ensuring that their information stays up-to-date.

In an embodiment, the interactive element 216 may include a sorting icon 216c, which may allow users to organize data based on specific criteria. In an embodiment, the sorting icon 216c may be useful when dealing with large datasets or lists that need to be filtered or reordered. Without limitation, by clicking the sorting icon 216c, users may arrange items by various attributes such as date, name, priority, and the like. In an embodiment, the sorting icon 216c may simplify the process of locating specific information, making the interface more efficient to use. In an embodiment, the sorting icon 216c may ensure that users can easily customize how they view and interact with the content.

In an embodiment, the interactive element 216 may include a folder icon 216d, which may represent access to a file or document management system. Without limitation, by clicking on the folder icon 216d it may open a directory or list of stored files, allowing users to organize their content within the application. In an embodiment, the folder icon 216d may be essential for managing documents, media, or other file types efficiently. In an embodiment, the folder icon 216d may be associated with file storage and navigation, making it a familiar and intuitive tool for users. In an embodiment, the folder icon 216d may aid in keeping information organized and accessible within the system.

In an embodiment, the interactive element 216 may include a new task icon 216c, which may allow users to create or add a new item to their task list or project. In an embodiment, the new task icon 216e may provide a quick way for users to input new assignments or goals, streamlining task management. In an embodiment, the new task icon 216e once clicked, may open a form or prompt where users may specify details about the new task. In an embodiment, the new task icon 216e may help users stay organized by adding tasks efficiently as they arise. In an embodiment, the new task icon 216e may be a valuable tool for productivity, helping users keep track of their to-do lists.

In an embodiment, the interactive element 216 may include a find icon 216f, which may function as a search tool for locating specific information within the application. In an embodiment, the find icon 216f may allow users to quickly search through data, files, or content to pinpoint exactly what they need. In an embodiment, the find icon 216f may be especially useful in applications that manage large volumes of information or files. In an embodiment, the find icon 216f may enhance efficiency by reducing the time spent manually browsing through content. Continuing, by providing a fast search function, users may access information more quickly and effectively.

In an embodiment, the interactive element 216 may include an edit icon 216g, which may enable users to modify or update existing content within the application. Continuing, by clicking on the edit icon 216g, it may bring users to an editable version of the item, such as a text document, task, or file. In an embodiment, the edit icon 216g may allow users to make corrections or updates as needed, maintaining the accuracy of the information. In an embodiment, the edit icon 216g may ensure that content remains current and can be easily adjusted as situations or data change. In an embodiment, the edit icon 216*g* may be a crucial tool for users who frequently update or revise their work.

Continuing reference to FIG. 2A, interactive element 216*h* may include a prompt box. representing a text box displaying the placeholder text "What can I help you with?" This prompt box could serve as a user input field within the graphical user interface, guiding users to enter their queries, commands, or requests. The "What can I help you with?" text may be a visual cue that prompts users to input their questions or instructions, helping them understand the expected interaction. When the user clicks or taps on the prompt box, the placeholder text may disappear, allowing the user to type in their query. The prompt box could be designed to accept various forms of natural language input and may be linked to the system's query processing engine, enabling users to submit queries seamlessly. This interactive element may also be configured to support real-time feedback, such as showing autocomplete suggestions or validating user input as they type, further enhancing user engagement and ensuring the system responds effectively to the query entered. In an embodiment, the data entered into element 216*i* may be used to train the constraint machine-learning model.

Continuing reference to FIG. 2A, interactive element 216*i* may include a user-entry box. which serves as a field for users to input text, commands, or other data into the system. This user-entry box could function as a critical component of the graphical user interface, enabling users to interact directly with the system by entering specific queries, instructions, or parameters. The user-entry box may display a placeholder, such as "Type your question here . . . " to guide the user on what type of input is expected. When a user engages with the user-entry box, such as by clicking or tapping on it, the system may allow them to type their desired input, which could range from natural language queries to specific operational commands. The box could be configured to handle a variety of input types, including alphanumeric text, dates, or even structured commands depending on the use case. In some embodiments, the user-entry box may also be equipped with additional features like autocomplete suggestions, input validation, and real-time feedback, which would assist users in constructing accurate and relevant queries. For example, as the user types, the system might suggest commonly used phrases or detect potential errors, offering corrections or alternative options. This enhances the user experience by making interactions more intuitive and reducing the likelihood of mistakes. Furthermore, the interactive element 216*i* could be integrated with the system's event handlers, triggering specific actions or queries once the user submits their input. This input could be processed by the system's back-end logic, enabling the generation of appropriate responses, data retrieval, or the initiation of follow-up tasks.

In an embodiment, the interactive element 216 may include a text prompt 216*j*. Element 216*j* displays a message or instruction asking the user to input any specific data constraints, guiding users on how to refine or limit the data they are requesting. This prompt ensures that users are aware of the option to apply constraints, making it easier to tailor queries to particular needs or parameters. Additionally, the interactive element 216 may include a response box 216*k* associated with data constraints. In an embodiment, 216*k* allows the user to enter any specific constraints related to their data query, such as date ranges, specific fields, or limits on data types. This response box provides a structured way for users to customize their inputs and narrow down results, improving the relevance and accuracy of the system's responses. The inputted data constraints may be used as training data within the constraint machine learning model.

Now referring to FIG. 2B, an exemplary illustration 200*b* of a response structure in a graphical user interface. In an embodiment, interactive element 216*l* may include response structure 164. which serves as the output area where the system presents the results of user queries or commands. The response structure could be generated in real-time based on user input and may display various types of data, such as text summaries, charts, tables, or other visual representations of the system's response. The response structure may be interactive, allowing users to engage with the displayed information. For instance, users could click on specific elements within the response structure, such as data points on a chart or text segments, to request additional details or perform follow-up actions. This interactive nature enables the response structure to serve not only as a display for the system's output but also as a hub for further user interaction, driving the flow of information based on evolving queries or actions. In some embodiments, the response structure may be designed to dynamically update in response to changes in the user's input or the system's internal state. For example, if the user submits a secondary query or modifies parameters of the initial query, the response structure could be automatically refreshed to reflect the new data. The graphical elements within the structure, such as charts or tables, may be reconfigured to highlight relevant information or present new insights derived from the updated input. Additionally, the response structure could be designed with flexibility in mind, adapting to different types of responses depending on the context of the query. For instance, if the query relates to statistical data, the structure might include a combination of graphs and numerical summaries. Alternatively, for more complex data requests, the response structure may provide a detailed narrative or multi-tiered analysis, ensuring that users can easily interpret the results.

In an embodiment, the interactive element 216 may include a text prompt 216*m*, which asks the user if there are any additional adjustments needed. This prompt guides users to consider any further modifications to their input or constraints. Additionally, the interactive element 216 may include a text box 216*n* for users to enter any additional adjustments. These adjustments may generate a new response structure, represented by element 216*l*, which can dynamically update based on the user's specified modifications. This feature enhances the interface by allowing users to refine outputs in real time according to their evolving needs.

Figure 3:
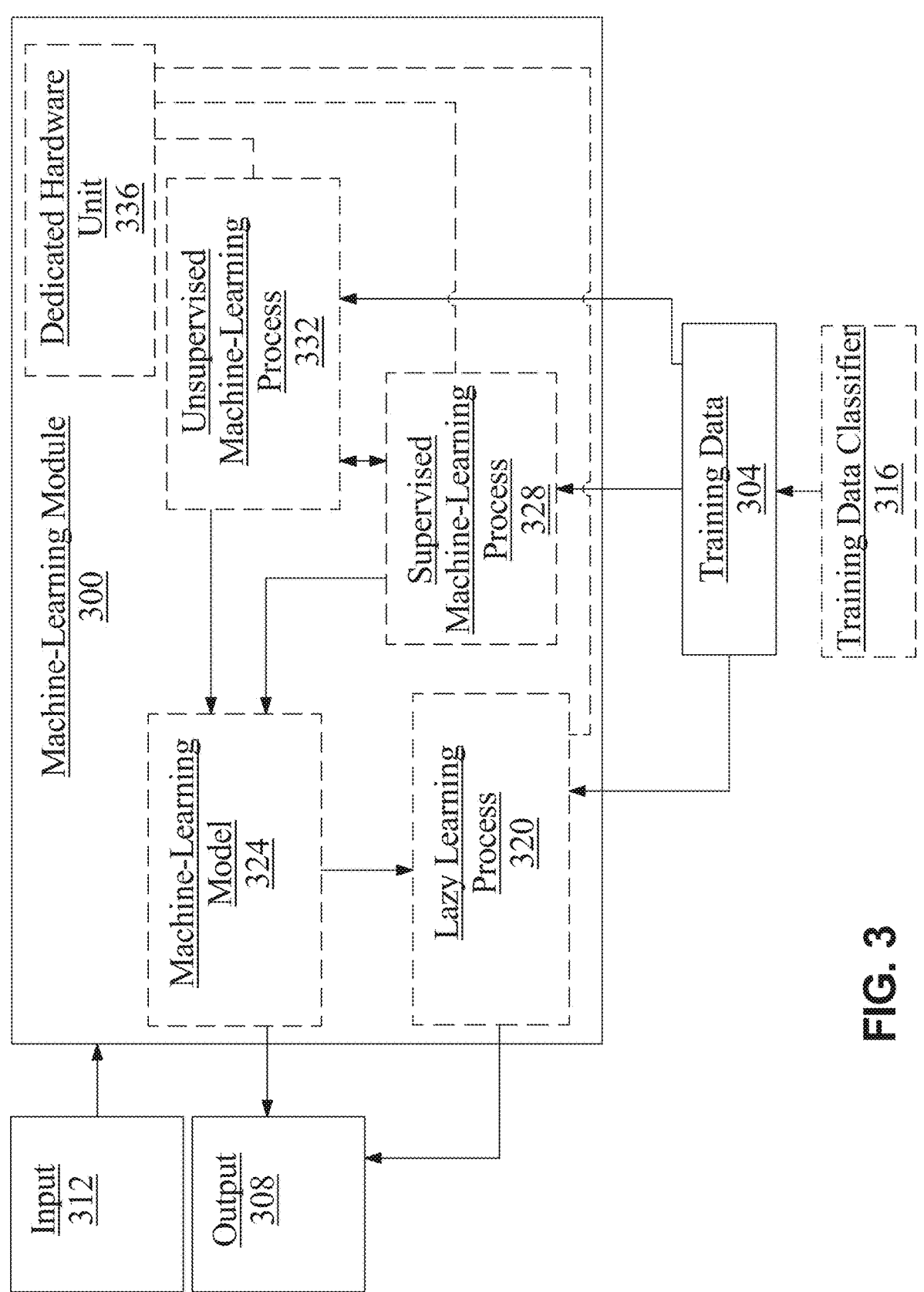
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs such as user input and plurality of command input event handlers and outputs such as optimization datum.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories of historical reference data and categories of historical plurality of command input event handlers.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user input and plurality of command input event handlers as described above as inputs, optimization datum as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, system, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, system, and/or or method described in this disclosure; such examples may be modified and/or labeled according to user feedback or other processes to indicate desired results, and/or may have actual or measured results from a process being modeled and/or or predicted by system, module, machine-learning model or algorithm, system, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, system, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
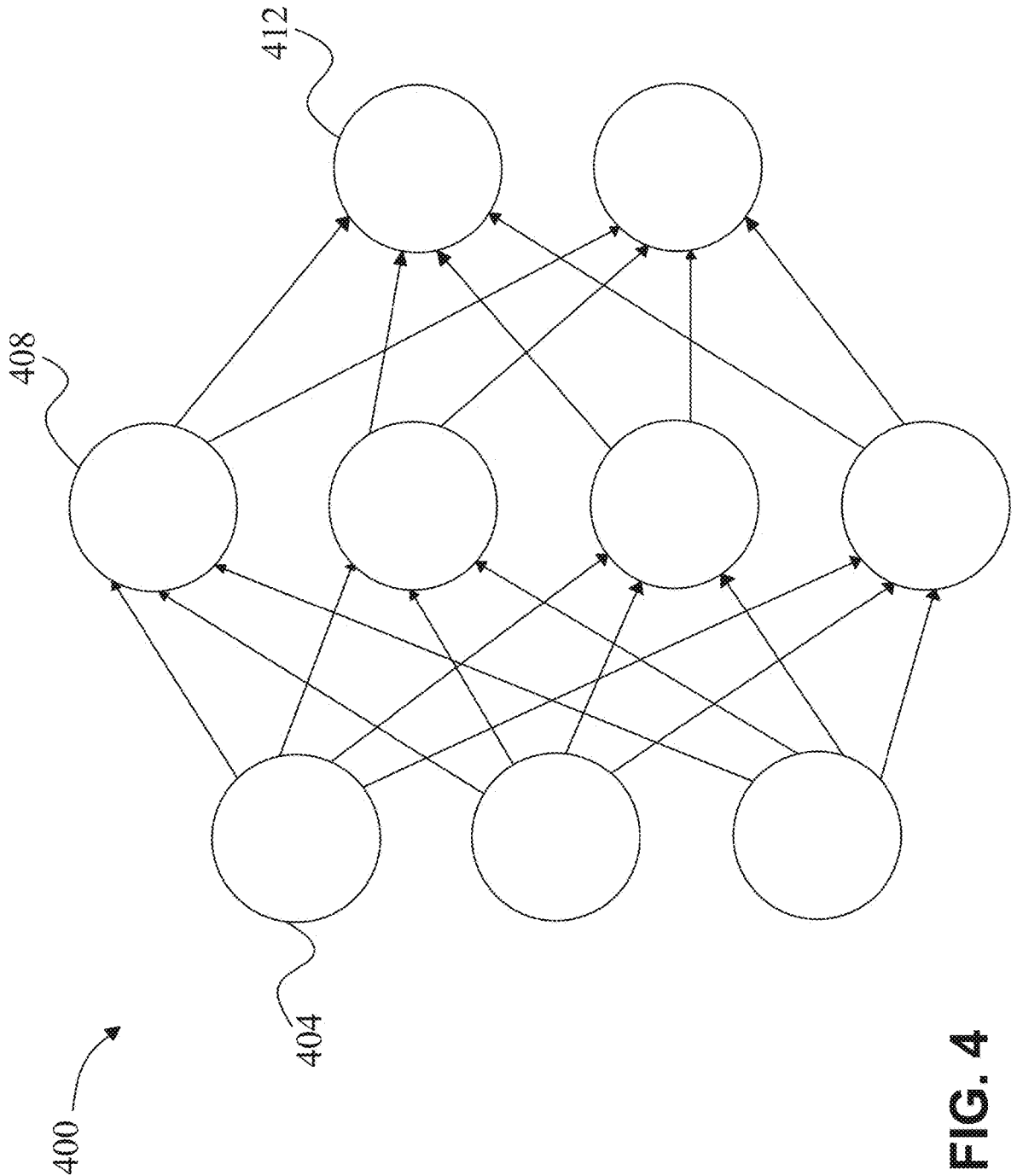
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
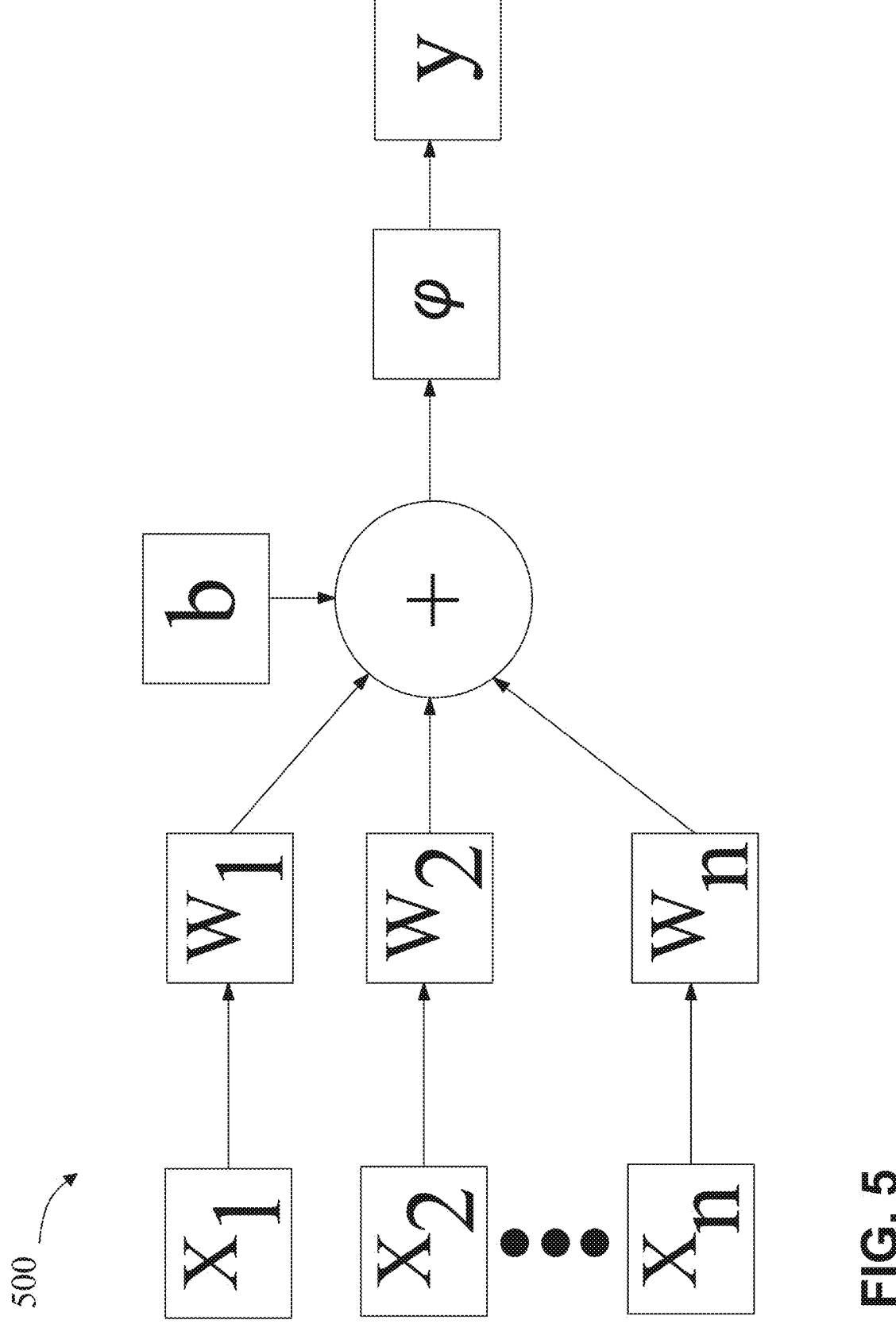
FIG. 5 is a diagram of an exemplary embodiment of a node of a neural network.

Referring now to FIG. 5, an exemplary embodiment of a node 500 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x*\text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
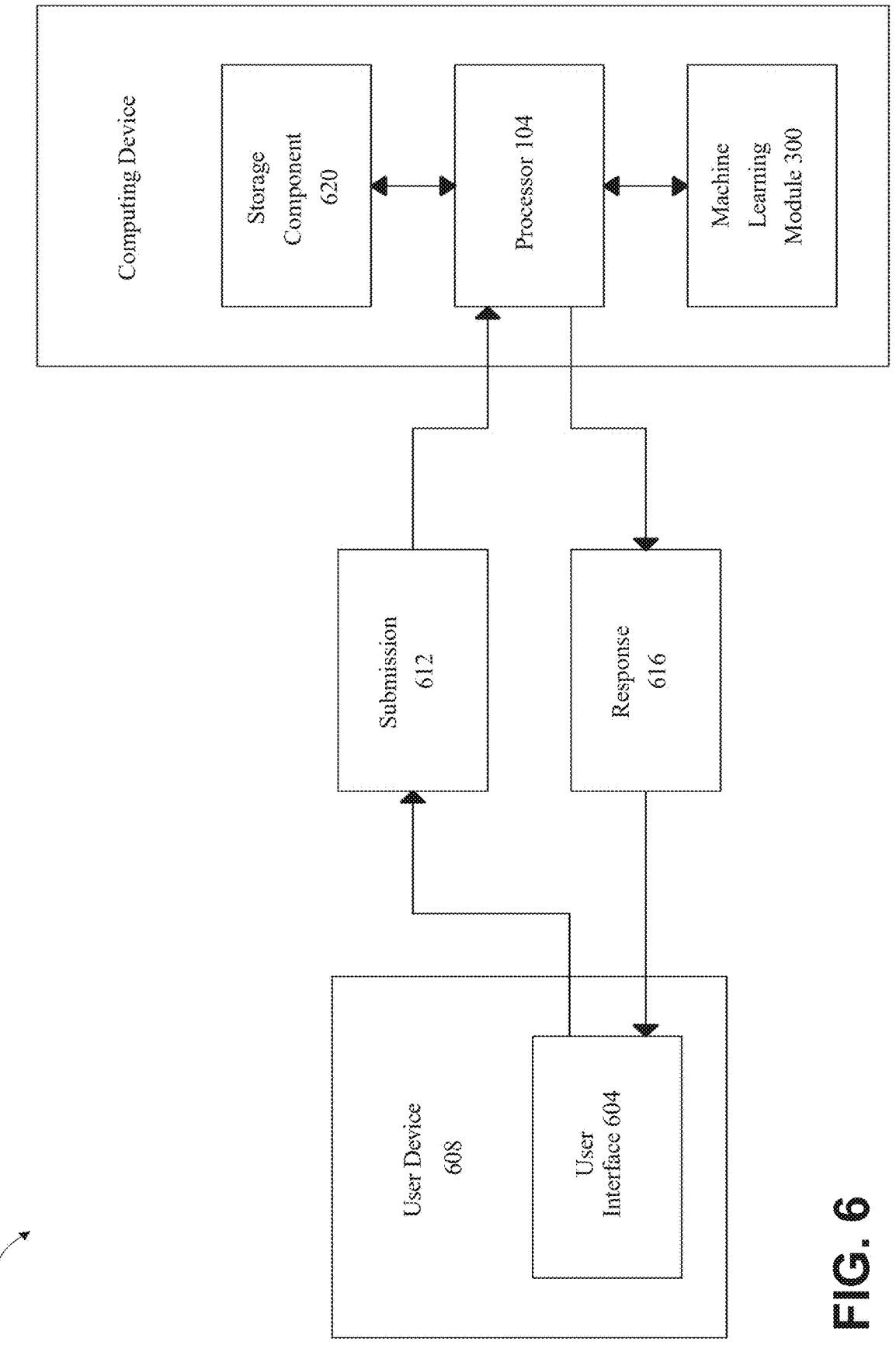
FIG. 6 is an exemplary embodiment of a chatbot system.

Referring now to FIG. 6, in one or more embodiments, system 100 may perform one or more of its functions, such as outputting at least an observation outcome 152*a-n*, by implementing at least a chatbot system 600, an exemplary embodiment of which is schematically illustrated. In one or more embodiments, a user interface 604 may be communicatively connected with a computing device that is configured to operate a chatbot. In some cases, user interface 604 may be local to computing device. Alternatively, or additionally, in some other cases, user interface 604 may be remote to computing device, e.g., as part of a user device 608, and communicative with the computing device and processor 102 therein, by way of one or more networks, such as without limitation the internet. Alternatively, or additionally, user interface 604 may communicate with user interface 604 and/or computing device using telephonic devices and networks, such as without limitation fax machines, short message service (SMS), or multimedia message service (MMS). Commonly, user interface 604 may communicate with computing device using text-based communication, for example without limitation using a character encoding protocol, such as American Standard for Information Interchange (ASCII). Typically, user interface 604 may conversationally interface a chatbot, by way of at least a submission 612, from the user interface 604 to the chatbot, and a response 616, from the chatbot to the user interface 604. In many cases, one, or both, of submission 612 and response 616 are text-based communication. Alternatively, or additionally, in some cases, one or both of submission 612 and response 616 are audio-based communication.

With continued reference to FIG. 6, submission 612, once received by user interface 604 and/or computing device that operates a chatbot, may be processed by processor 104. In one or more embodiments, processor 104 may process submission 612 using one or more of keyword recognition, pattern matching, and natural language processing. In one or more embodiments, processor 104 may employ real-time learning with evolutionary algorithms. In one or more embodiments, processor 104 may retrieve a pre-prepared response from at least a storage component 620, based upon submission 612. Alternatively, or additionally, in one or more embodiments, processor 104 may communicate a response 616 without first receiving a submission 612, thereby initiating a conversation. In some cases, processor 102 may communicate an inquiry to user interface 604 and/or computing device, wherein processor 104 is configured to process an answer to the inquiry in a following submission 612 from the user interface. The user interface 604 and/or computing device. In some cases, an answer to an inquiry presented within submission 612 from user interface 604 and/or computing device may be used by the computing device as an input to another function.

Now referring to FIG. 7, a flow diagram of an exemplary method 700 for generating a response structure using a chatbot user interface is illustrated. At step 705, method 700 includes receiving, by at least a processor, a query using a chatbot interface operating on the display device. This may be implemented with reference to FIGS. 1-6.

Still referring to FIG. 7, at step 710, method 700 includes, generating, by the at least a processor, an action protocol as a function of the query, wherein generating the action protocol includes: generating a set of requested data constraints using a constraint machine-learning model; and mapping the set of requested data constraints to a range of database entries. In an embodiment, generating the actional protocol comprises parsing a database, generating the action protocol comprises requesting additional data not contained within the database, the constraint machine-learning model comprise a large language model, the constraint machine-learning model is iteratively trained as a function of user feedback relating to the accuracy of an output of the constraint machine-learning model, and the constraint machine-learning model comprises a classifier configured to classify the query into one or more data constraints. This may be implemented with reference to FIGS. 1-6.

Still referring to FIG. 7, at step 715, method 700 includes generate a response structure as a function of the action protocol, wherein generating the response includes: retrieving requested data from a database using the range of database entries; inputting the requested data and the query into a second large language model; and generating the response structure using the second large language model. In an embodiment, at least a processor is configured to receive at least a second query as a function of the generated response and at least a processor is configured to generate revised constraints as a function of the second query. This may be implemented with reference to FIGS. 1-6.

Still referring to FIG. 7, at step 720, method 700 include configuring, by the at least a processor, the display device to display the response structure using the chatbot interface. In an embodiment, configuring the display device to display the response structure comprises generating a display data structure using a plurality of visual elements and at least an event handler. This may be implemented with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
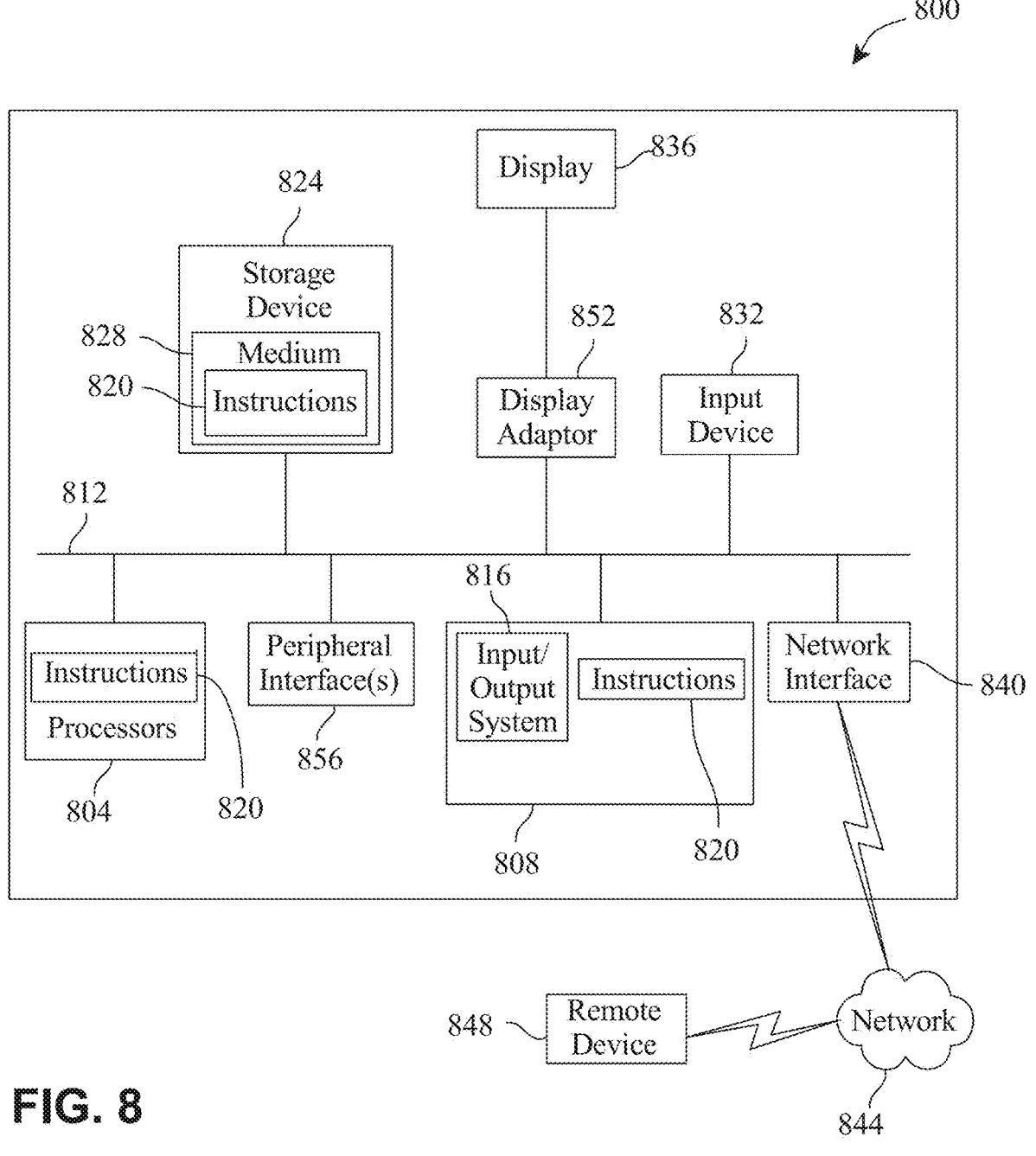
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating a response structure using a chatbot user interface, wherein the system comprises:
   a display device, wherein the display device displays a graphical user interface;
   at least a computing device, wherein the computing device comprises:
   a memory; and
   at least a processor communicatively connected to the memory, wherein the memory contains instructions configuring the at least a processor to:
   receive a first query using a chatbot interface operating on the display device;
   generate an action protocol as a function of the first query, wherein generating the action protocol comprises:
      generating a set of requested data constraints using a constraint machine-learning model, wherein generating the set of requested data constraints comprises:
         training the constraint machine-learning model, wherein training the constraint machine-learning model comprises:
         sanitizing training data to eliminate noise, wherein the training data comprises a plurality of query data correlated with a plurality of example constraint data;
         determining that at least one training data entry of the training data has a signal to noise ratio below a threshold value; and
         removing the at least one training data entry from the training data to create sanitized training data; and
         training the constraint machine-learning model using the sanitized training data until the constraint machine-learning model satisfies a convergence test, wherein sanitizing of the training data accelerates convergence of the constraint machine-learning model; and
         generating the set of requested data constraints using the trained constraint machine-learning model; and
      mapping the set of requested data constraints to a range of database entries;
   generate a response structure as a function of the action protocol, wherein generating the response comprises:
      retrieving requested data from a database using the range of database entries specified by the action protocol;
      inputting the requested data and the query associated with the action protocol into a second machine-learning model; and generating the response structure under control of the action protocol using the second machine-learning model;
   configure the display device to display the response structure using the chatbot interface;
   receive, through the chatbot interface, a second query from a user;
   identify one or more new parameters from the second query;
   adjust the set of requested data constraints of the action protocol as a function of the one or more new parameters; and
   reconfigure one or more visual elements of the response structure as a function of the adjusted set of requested data constraints.

2. The system of claim 1, wherein generating the action protocol comprises parsing a database.

3. The system of claim 2, wherein parsing the database comprises:
   searching the range of database entries;
   generating a request for additional information in an event that the range of database entries are empty;
   presenting, using the display device, the request for additional information to a user; and
   receiving, as user input, the additional information in response to the request for additional information.

4. The system of claim 1, wherein generating the response structure comprises generating at least a slide file.

5. The system of claim 1, wherein the constraint machine-learning model is iteratively trained as a function of user feedback relating to an accuracy of an output of the constraint machine-learning model.

6. The system of claim 1, wherein the constraint machine-learning model comprises a classifier configured to classify the first query to the set of requested data constraints.

7. The system of claim 1, wherein configuring the display device to display the response structure comprises generating a display data structure using a plurality of visual elements and at least an event handler.

8. A method for generating a response structure using a chatbot user interface, wherein the method comprises:
   receiving, by at least a processor, a first query using a chatbot interface operating on a display device;
   generating, by the at least a processor, an action protocol as a function of the first query, wherein generating the action protocol comprises:
      generating a set of requested data constraints using a constraint machine-learning model, wherein generating the set of requested data constraints comprises:
         training the constraint machine-learning model, wherein training the constraint machine-learning model comprises:
         sanitizing training data to eliminate noise, wherein the training data comprises a plurality of query data correlated with a plurality of example constraint data;
         determining that at least one training data entry of the training data has a signal to noise ratio below a threshold value;
         removing the at least one training data entry from the training data to create sanitized training data; and
         training the constraint machine-learning model using the sanitized training data until the constraint machine-learning model satisfies a convergence test, wherein sanitizing of the training data accelerates convergence of the constraint machine-learning model; and generating the set of requested data constraints using the trained constraint machine-learning model; and mapping the set of requested data constraints to a range of database entries;

generating, by the at least a processor, a response structure as a function of the action protocol, wherein generating the response comprises:

retrieving requested data from a database using the range of database entries specified by the action protocol;

inputting the requested data and the query associated with the action protocol into a second machine-learning model; and generating the response structure under control of the action protocol using the second machine-learning model;

configuring, by the at least a processor, the display device to display the response structure using the chatbot interface;

receiving, through the chatbot interface, a second query from a user;

identifying, using the at least a processor, one or more new parameters from the second query;

adjusting, using the at least a processor, the set of requested data constraints of the action protocol as a function of the one or more new parameters; and reconfiguring, using the at least a processor, one or more visual elements of the response structure as a function of the adjusted set of requested data constraints.

9. The method of claim 8, wherein generating the action protocol comprises parsing a database.

10. The method of claim 9, wherein parsing the database comprises:

searching the range of database entries;

generating a request for additional information in an event that the range of database entries are empty;

presenting, using the display device, the request for additional information to a user; and receiving, as user input, the additional information in response to the request for additional information.

11. The method of claim 8, wherein generating the response structure comprises generating at least a slide file.

12. The method of claim 8, wherein the constraint machine-learning model is iteratively trained as a function of user feedback relating to an accuracy of an output of the constraint machine-learning model.

13. The method of claim 8, wherein the constraint machine-learning model comprises a classifier configured to classify the first query into one or more data constraints.

14. The method of claim 8, wherein configuring the display device to display the response structure comprises generating a display data structure using a plurality of visual elements and at least an event handler.

15. The system of claim 1, wherein reconfiguring one or more visual elements of the response structure as a function of the adjusted set of requested data constraints comprises:

mapping the adjusted set of requested data constraints to a second range of database entries; and retrieving a second set of requested data from the database using the second range of database entries, wherein retrieving the second set of requested data from the database using the second range of database entries comprises identifying redundant data retrieval as a function of the range of database entries and the second range of database entries.

16. The system of claim 15, wherein retrieving the second set of requested data from the database using the second range of database entries further comprises retrieving data for the redundant data retrieval from a cache.

17. The system of claim 16, wherein the memory contains instructions further configuring the at least a processor to store the requested data in the cache.

18. The method of claim 8, wherein reconfiguring one or more visual elements of the response structure as a function of the adjusted set of requested data constraints comprises:

mapping the adjusted set of requested data constraints to a second range of database entries; and retrieving a second set of requested data from the database using the second range of database entries, wherein retrieving the second set of requested data from the database using the second range of database entries comprises identifying redundant data retrieval as a function of the range of database entries and the second range of database entries.

19. The method of claim 18, wherein retrieving the second set of requested data from the database using the second range of database entries further comprises retrieving data for the redundant data retrieval from a cache.

20. The method of claim 19, further comprising storing, using the at least a processor, the requested data in the cache.

* * * * *